Patented June 15, 1943

2,322,097

UNITED STATES PATENT OFFICE 2,322,097

CATALYTIC HYDROGENATION OF ALIPHATIC CARBOXYLIC ACID ANHYDRIDES

Otto Schmidt, Heidelberg, Germany, assignor, by mesne assignments, to General Aniline & Film Corporation, New York, N. Y., a corporation of Delaware No Drawing. Original application April 1, 1931, Serial No. 527,060. Divided and this application June 26, 1941, Serial No. 399,927. In Germany November 20, 1925

12 Claims. (Cl. 260—638)

This application is a division of Ser. No. 527,060, filed April 1, 1931.

The present invention relates to the reduction of organic acids and certain derivatives thereof to alcohols and/or esters and mixtures essentially consisting of or containing preponderating quantities of the said products.

It is already known that esters of fatty acids of low molecular weight and the corresponding anhydrides can be reduced in the gaseous phase with the aid of hydrogen and of metallic hydrogenation catalysts at atmospheric pressure. In most cases, however, as for example in the reduction of acetic ethyl ester heterogeneous products have been obtained which contained some aldehyde and olefines. Even the reduction of anhydrides in the liquid phase with noble metal hydrogenation catalysts, such as palladium, and at slightly elevated pressure up to 4 atmospheres furnished heterogeneous products consisting mainly of aldehydes.

I have found that in organic compounds having at least 2 carbon atoms and containing a carboxylic acid radicle (i. e. at least 2 oxygen atoms connected to one carbon atom) said compounds being, for example, mono- or poly-carboxylic acids containing at least 2 carbon atoms, such as aliphatic open chain or cycloaliphatic, and aromatic carboxylic acids, and their derivatives containing at least 2 oxygen atoms connected to one carbon atom, especially of those acids which contain at least 8 carbon atoms in their molecule, the free or latent carboxylic groups can be reduced to alcoholic groups by treating the said compounds in the liquid state at an elevated temperature with hydrogen in the presence of hydrogenation catalyst at a pressure of at least 30 atmospheres until the saponification value of the initial materials is considerably diminished. In order to obtain good results it is usually necessary to work under energetic conditions at increased temperatures, such as above 120° C.

An efficient activation of the catalysts can be obtained by a very fine disintegration of the catalytic substances, for example by employing the catalytic substances alone in a very finely divided form, or by depositing the catalytic substances on large surface carriers, such as fibrous asbestos, powdered graphite, silica gel or inert metal powders and the like, and/or by adding to the catalytic substances one or more activating substances. Suitable catalytic substances are for example the base metals, copper, nickel, iron, cobalt or silver or mixtures thereof and they may be prepared from their salts, oxides or other compounds, if desired prior to or after an incorporation with activating substances. Compounds of metals which are converted into the metals during the operation may be also employed, as for example salts of cobalt with any organic carboxylic acids. The activating substances may be chosen from compounds of the solid metallic elements of the 1st to 7th groups of the periodic system as for example from compounds, especially of oxygen-containing compounds, such as hydroxides, oxides, carbonates, phosphates, silicates, nitrates, or also cyanides complex compounds as for example iron-cyanides and the like, of the alkali or the alkaline earth or rare earth metals, such as potassium, sodium, calcium, barium or magnesium, lanthanum, thorium, cerium and zirconium, further boron and particularly from compounds of the metals giving acids with oxygen, such as chromium, molybdenum, tungsten, uranium, manganese, vanadium or titanium or mixtures thereof as well as salts of the metal acids or several of these compounds. The metals forming acids with oxygen may be employed in the form of the alkali metal, alkaline earth metal or rare earth metal salts of the said acids or in the form of their salts with the hydrogenating metals, as for example copper, nickel, cobalt, iron, silver or zinc vanadates, molybdates, manganic salts, uranates, tungstates and the like and in this case the said hydrogenating metals must not be present as such. The solid metals of the 2nd to 4th groups of the periodic system, as for example zinc, cadmium, tin, and aluminum may also be employed in the free state for activating purposes, the said cheap and easily available metals being preferred. The order of mixing the aforesaid single components is not important and, as already stated, the activating substances may be mixed with compounds of the hydrogenating metals, whereupon the whole mass is subjected to a treatment with hydrogen, whereby reducible compounds of the hydrogenating metals are converted wholly or at least partially into the free metals. Otherwise the components may be mixed for example in a melt of fusible activating substances, such as alkali metal compounds, to which the hydrogenating metals or the compounds are added. In cases when compounds are to be hydrogenated which still contain catalyst poisons, such as animal fats containing albuminous matter, catalysts immune from poisoning, as for example those containing molybdenum or its compounds alone or in admixture with other substances may be employed.

By suitably selecting the catalyst as well as the reaction temperature and the pressures, the reduction can be carried either to a well defined stage, i. e. to the formation of products which contain alcoholic groups or even to products in which the original carboxyl groups are reduced to hydrocarbon radicles. Thus, for example, soya bean oil can be reduced to a mixture of pure alcohols corresponding to the fatty acids of the original oil. In many cases catalysts consisting of nickel provide more energetic reduction than catalysts prepared from cobalt or copper, which latter are particularly valuable for the production of alcohols, whereas the employment of a highly active nickel catalyst may lead to a reduction to the hydrocarbon stage, especially at higher temperatures, say between 300° and 400° C. The efficiency of the catalyst employed, however, depends to a large extent on whether a carrier or other additions are employed. Thus, for example, a catalyst consisting of nickel and activated with chromium provides a most energetic reduction when working in the liquid phase and often leads to the formation of hydrocarbons whereas nickel deposited on, say, nine times its weight of kieselguhr furnishes products with a high saponification value. Catalysts prepared from cobalt with additions of a basic nature, such as alumina, magnesia or potassium hydroxide are particularly suitable for the production of alcohols.

The temperatures employed depend, generally speaking, on the nature of the material under treatment and its volatility; temperatures between 120° and 400° C. are usually employed. For the reduction of the carboxyl groups into alcoholic groups temperatures between about 150° and 300° C. are advantageously employed, whereas the application of temperatures substantially above 250° C. favours the formation of hydrocarbons especially when working with active catalysts of nickel as mentioned above; if catalysts of copper be employed the temperatures may be somewhat higher. The optimum reaction temperature for the production of a certain reaction product depends on the nature of the initial material and on the nature of the catalyst employed.

The pressure employed depends on the nature of the initial materials; any pressure of at least 30 atmospheres, preferably from 100 to 300 atmospheres, or still higher pressures, such as up to 400 or 500 atmospheres, will be applied; straight chain hydroxy-carboxylic, carboxylic acids with branched chains and anhydrides require usually lower pressures than straight chain saturated acids and their esters. For the reduction of olive oil into the alcohols corresponding to the fatty acids of olive oil for example a pressure above 150 atmospheres is usually necessary whereas hydroxy-octodecanol can be obtained from castor oil at lower pressures as for example at 45 atmospheres. The application of higher pressures usually shortens the period of time required for the reaction. Thus, for example, stearic methyl ester can be reduced to octodecanol at a pressure of 300 atmospheres in about half the time required when working at a pressure of 200 atmospheres under otherwise equal conditions of working. The period of time required for carrying out the process also depends on the manner in which the hydrogen is introduced, and on the homogeneous dispersion of the catalyst within the initial material, intimately stirring and/or spraying the mixture of initial material and catalyst into the reaction vessel providing for example most satisfying results. The process may be carried out continuously or intermittently in any usual and convenient manner.

The quantity of hydrogen employed is advantageously chosen considerably above that theoretically required for the reduction. In the place of pure hydrogen gaseous mixtures containing the same may also be employed, the hydrogen being diluted for example with vapor of water, alcohol, or with nitrogen or carbon dioxide. If desired, diluents inert to the initial materials, such as small quantities of water, or cyclohexane, benzines, phenols, alcohols of high molecular weight may be added, unsaturated compounds being hydrogenated in many cases during the reaction. By the addition of alcohols the reaction is often facilitated on working with free acids, esters formed thereby being apparently more easily reduced than free acids.

In this manner even carboxylic acids, and their derivatives of the aforesaid nature, having a very high molecular weight, such as oleic methyl ester, oleic acid or train oil acid, other acids of vegetal origin, that is of vegetable and animal oils or fats, or oxidation products of paraffin wax or glycerides, such as soya bean oil, coconut oil, castor oil, tallow train oils, and the anhydrides, or mixtures thereof with salts of the corresponding acids, and benzoic alkyl esters and esters of homologues of benzoic esters, naphthenic esters and the like can be converted into alcohols of the aliphatic series, having a high molecular weight which hitherto have not been available commercially. When employing acids and the like which contain double linkages or other readily reducible groups, as for example nitro groups, a hydrogenation of the double linkages, a reduction of the nitro groups and the like often takes place first during the hydrogenation. If hydroxy-carboxylic acids, or their derivatives, such as castor oil, be employed polyhydric alcohols or primary monohydric alcohols are obtained in many cases, the original secondary hydroxyl group being apparently less resistant to reduction. The alcohols obtained may find useful application in the production, for example, of artificial waxes or cosmetic preparations or of washing, emulsifying or wetting agents by sulphonation, for which purposes they may be employed even in acid baths or together with hard water. The alcohols may also find useful application for softening natural or synthetic rubber or rubber-like substances, such as gutta percha and the alcohols having a long chain may be esterified with long chain carboxylic acids, such as montanic acid, for the formation of synthetic waxes. The high molecular alcohols obtained may be esterified with low molecular carboxylic acids, such as acetic acid, and the esters may find useful application as assistant solvents in the lacquer or varnish industries or as swelling or gelatinizing agents. Wax-like esters having very valuable properties are often formed in the reaction according to the present invention, and these are formed from high molecular alcohols formed and from remainders of the non-reduced acids, or their derivatives, some portion of the acids, or their derivatives, being reduced to alcohols which latter then react with the acid not yet reduced with the formation of esters, the saponification value being thus reduced by from $\frac{1}{8}$ to $\frac{1}{3}$; on the other hand the saponification value may be reduced to from $\frac{1}{2}$ to zero if alcohols in the free and esterified state are mainly desired, a reduction by almost ½ giving a product consisting nearly exclusively of ester. The reduction of glycerides may also be carried out in such a manner that either these wax-like products solely are obtained or mixtures thereof with a certain predetermined content of alcohols or of hydrogenated glycerides. This can be obtained by reducing the pressure and/or temperature depending on the nature of the initial material and on the activity of the catalyst employed. These wax-like products may be employed as substitutes for bees-wax, spermaceti and the like or may be converted into alcohols by further treatment according to the present invention. The wax-like esters obtained may be employed in the place of or in conjunction with dressing or impregnating agents in the textile industries or as assistants in the preparation of polishes.

The following examples will further illustrate how the said invention may be carried out in practice, but the invention is not restricted to these examples.

Example 1

A mixture of carboxylic acids consisting of lower members of the fatty acid series and obtained by the destructive oxidation of a low melting point paraffin wax with the aid of nitrogen dioxide is incorporated with 5 per cent its weight of pyrophorous cobalt powder (obtainable by reducing cobalt carbonate (Merck) in the pulverulent state at about 350° C. with hydrogen) and then treated at 200° C. with hydrogen at a pressure of 200 atmospheres until the decrease of pressure has ceased. The catalyst is then filtered off and the filtrate is subjected to distillation at about 12 millimeters (mercury gauge) whereby a mixture of alcohols having a hydroxyl value of 290 is obtained at a temperature between 80° and 200° C. The distillation residue which is obtained in a quantity of about 10 per cent of the whole material subjected to distillation contains wax-like bodies. The catalysts separated off can be employed as such for further operations.

Example 2

A commercial mixture of the anhydrides of palmitic and stearic acids is incorporated with 3 per cent its weight of a catalyst consisting of metallic cobalt and potassium oxide which has been prepared by treating a mixture of cobalt carbonate and 1 per cent its weight of potassium nitrite at about 350° C. with hydrogen for 36 hours, and the mixture is treated with hydrogen at 230° C. and 300 atmospheres until the consumption of hydrogen has ceased. After separating the product from the catalyst by filtration, the former is distilled at 25 millimeters (mercury gauge), whereby the alcohols corresponding to the anhydrides employed are obtained at between 180° and 220° C.

Example 3

A catalyst of metallic cobalt which has been treated with hydrogen for 36 hours at 360° C. and which has been activated by the addition of 2 per cent of vanadic acid is added to stearic acid and the latter is treated with hydrogen at 225° C. under a pressure of 200 atmospheres until no more hydrogen is absorbed. The distillation of the reaction product in vacuo after careful removal of the catalyst yields mainly octodecyl alcohol having a boiling point of from 203° to 210° C. at 11 millimeters mercury gauge and a melting point of 56° C., the catalyst being removed in order to avoid a dehydrogenation. The wax, namely the octodecyl ester of stearic acid, which remains behind after the distillation in some cases may be subjected to reduction again so that the yield of alcohol is practically complete.

A similar procedure is followed in the reduction of other carboxylic acids, such as butyric acid, succinic acid, colophony, linoleic acid, montanic acid, naphthenic acids, acids from the oxidation of paraffin and like waxes, or mixtures with salts of carboxylic acids, as for example the ammonium salt of stearic acid and the like.

Example 4

A mixture of cobalt and copper carbonates is precipitated from an aqueous solution of 70 parts of cobalt nitrate and 30 parts of copper nitrate by adding potassium bicarbonate. After carefully washing the paste is stirred with 1 part of potassium bichromate, dried, pulverized and treated with hydrogen for 18 hours at 300° C. Stearic methyl ester to which about 3 per cent of this catalyst has been added is treated with hydrogen at 230° C. in a rotary autoclave and the pressure is kept at 200 atmospheres until hydrogen is no longer absorbed. The contents of the autoclave are subjected to a distillation during which mainly octodecyl alcohol (melting point 56° C.) passes over between 200° and 210° C. at 11 millimeters mercury gauge in a yield of about 95 per cent. The wax formed during the reduction and left behind after the distillation may be subjected to reduction again so that the yield of alcohol is almost complete. The alcohol may find useful application as a softening agent in the rubber industry.

Instead of the aforesaid catalyst, a catalyst from commercial cobalt carbonate may be employed without the addition of bichromate and the reaction may be carried out at 250° C. and at 300 atmospheres. If, in this case, the reaction be stopped after one hour, the product possesses a saponification value of 108, is solid, pale yellow and consists of about 70 per cent of octodecyl stearate and 15 per cent each of octodecyl alcohol and initial material together with traces of hydrocarbons. This mixture may find useful application in the production of sizes for the textile industries.

If desired, equal parts of phenol and of stearic methyl ester may be mixed with 5 per cent by weight of the catalyst described in Example 1 and heated in a rotary autoclave to 220° C. while forcing in hydrogen at a pressure of 200 atmospheres until the absorption of hydrogen has ceased. By fractional distillation of the product hexahydrophenol and octodecyl alcohol are obtained in a yield each of more than 90 per cent. Instead of phenol, benzene or like hydrogenizable compounds, hydrogenated benzene or other inert compounds may be employed.

Example 5

Cobalt carbonate and aluminum oxide are made into a paste with water ground in a ball mill and kept for 36 hours in a current of hydrogen at 350° C., the initial compounds being employed in such quantities that, after the reduction, the mixture contains 17 per cent of metallic cobalt. 1 metric ton of commercial soya bean oil to which about 7 per cent of this catalyst has been added is treated with hydrogen at 230° C. in a stirring autoclave of about 1.5 cubic meters and the pressure is kept at 200 atmospheres until there is no further absorption of hydrogen, the partial pressure of hydrogen being preferably maintained by intermediately blowing off the mixture of hydrogen and hydrocarbons formed from glycerol, such as methane and propane, and reintroducing fresh hydrogen. The contents of the autoclave are subjected to a distillation during which in addition to a small amount of first runnings mainly octodecyl alcohol having a boiling point of from 203° to 210° C. at 11 millimeters mercury gauge and a melting point of about 56° C. passes over. By working in this manner, the glycerine is mainly converted into propyl alcohols, 1.2-propylene glycol and partly into propane and methane. The small amount of wax formed during the reduction and remaining behind after the distillation may be subjected to reduction again so that the yield of alcohol is practically quantitative. In a similar manner waxes, such as bees-wax or carnauba wax may be reduced with the formation of alcohols from the acids in admixture with the alcohols originally contained in the waxes. Under the aforesaid conditions of working coconut fat furnishes a mixture of alcohol containing from 8 to 18 carbon atoms.

By increasing the temperature to 275° C. the octodecyl alcohol is reduced to octodecane which can thus be obtained in a pure form.

By reducing the pressure to about 150 atmospheres a wax-like substance is obtained.

Example 6

Finely powdered kieselguhr is incorporated with 10 per cent of its weight of nickel by treatment with nickel nitrate and reduction and then the whole is stirred with an aqueous solution of about 3 per cent by weight of the nickel of potassium bichromate. After drying and grinding, the mass is treated with hydrogen for 36 hours at 350° C. Soya bean oil is then mixed with 10 per cent of its weight of the catalytic mass and hydrogen is introduced at 200 atmospheres at 200° C. until a sample shows a saponification value of from 150 to 170 and an acid value of from 15 to 20. The product obtained having a melting point of about 60° C. is separated from the catalytic mass which latter may be directly employed for another operation. The wax-like product shows conchoidal fracture surfaces and possesses a high gloss. The process can also be easily conducted in such a manner that any desired ratio of ester and hydrogenated soya bean oil or of ester and octodecanol may be obtained in the products. Generally speaking, products having a high saponification value possess a high hardness and a high gloss, whereas products with lower saponification values, i. e. mixture of the ester and alcohols obtained during the reaction are softer and more mat than the aforesaid products and possess a lower melting point. Similar products can be obtained from train oil, rape-seed oil and other glycerides. Products having a saponification value of about ½ that of the initial material usually possess a crystalline nature like spermaceti. The products obtained may find useful application in the textile industries for example as dressing or impregnating agents as such or in conjunction with the known agents employed for this purpose.

Example 7

Benzoic ethyl ester is incorporated with 2 per cent of its weight of a catalyst consisting of cobalt and alumina, prepared from a mixture of cobalt and aluminum nitrates by precipitation and subsequent treatment with hydrogen at from 320° to 350° C., and 2 per cent of the cobalt, whereupon the whole is heated at 210° C. in an autoclave while stirring and pressing in hydrogen at 200 atmospheres until the pressure remains constant. 80 per cent of the product consists of hexahydrobenzyl alcohol which boils at about 180° C. at atmospheric pressure. In the same manner phthalic esters or esters of other aromatic polycarboxylic acids can be reduced to the corresponding hydrogenated alcohols.

Example 8

Castor oil is heated at 220° C. in a stirring autoclave with 3 per cent of its weight of a catalyst consisting of cobalt activated by potassium hydroxide and prepared by making cobalt carbonate into an aqueous paste with 1 per cent of its weight of potassium nitrite, drying and treating the mass with hydrogen at 310° C., while introducing hydrogen until a pressure of 45 atmospheres is attained. After 24 hours the reaction product is drawn off and distilled in vacuo and furnishes at 18 millimeters of mercury a distillate passing over between 217° and 240° C. in a quantity of 50 per cent by weight of the castor oil.

By increasing the pressure under otherwise equal conditions of working the yield of whole distillate can be increased to more than 95 per cent of the theoretical yield; the portion of the distillate boiling at from 230° to 240° C., at 18 millimeters of mercury, is practically pure hydroxy-octodecyl alcohol, having a melting point of 65° C. and a hydroxyl value of 382.

Example 9

Adipic di-ethyl ester is incorporated with 3 per cent of its weight of cobalt which has been prepared by reducing finely powdered cobalt carbonate with hydrogen at 300° C., whereupon the mixture is treated at 190° C. with hydrogen at a pressure of 180 atmospheres until the consumption of hydrogen has ceased. After cooling, the oily reaction product is filtered off from the cobalt and distilled in vacuo. At from 150° to 151° C. and 17 millimeters of mercury 1.6-dihydroxyhexane having a melting point of 42° C. is obtained in a yield of more than 50 per cent by weight of the initial material. Hexyl alcohol is obtained in the fractions boiling below 150° C.

Example 10

Montan wax bleached according to the specification of U. S. Patent No. 1,777,766 and having an acid value of about 140 is esterified with methyl alcohol by boiling it under reflux for 4 hours with ⅕ of its weight of methyl alcohol and ⅕₀ of its weight of hydrochloric acid, 100 parts of the methyl ester thus prepared having a saponification value of 162 are incorporated with 2 parts of a nickel-kieselguhr catalyst consisting of 1 part of nickel deposited on 5 parts of kieselguhr and heated with hydrogen at about 180° to 200° C. under a pressure of 100 atmospheres while pressing in hydrogen. As soon as the reaction product has a saponification value of about 80 the hydrogenation is interrupted. After filtering off the catalyst, a pale hard wax having a melting point of 85° C. is obtained on cooling.

Example 11

1000 parts of a product, consisting mainly of montanic acid and obtained by bleaching deresinified montan wax with chromic acid and having a saponification value of 173 and an acid value of 148, are heated in an autoclave to 220° C. together with a catalyst consisting of 58.8 parts of nickel and 1.2 parts of chromium, while pressing in hydrogen up to a pressure of 200 atmospheres. As soon as the saponification value has been diminished to 88 and the acid value to 14 the reaction product is drawn off and saponified with alcoholic caustic potash. The acids and unsaponifiable matter are then precipitated with dilute aqueous sulphuric acid whereby a mixture is obtained which possesses an acid value of 83 and can be esterified by boiling for 2 hours at about 120° C. with the aid of 0.04 per cent of concentrated sulphuric acid. The resulting product possesses an acid value of 5.6 and is a hard wax-like mass of white shade.

*Example 12*

Lauric anhydride is heated in an autoclave to 230° C. together with a catalyst, which has been prepared by reduction of cobalt carbonate to each 100 molecular proportions of which 2 molecular proportions of potassium hydroxide have been added, while pressing in hydrogen up to a pressure of 200 atmospheres, the quantity of hydrogen consumed being replenished and the reaction being stopped as soon as the consumption of hydrogen has ceased. The reaction product is then freed from the catalyst by filtration and subjected to distillation in vacuo. 70 per cent of the product consists of dodecanol boiling at about 142° C. at 11 millimeters of mercury, a small fraction boiling at 220° C. at 2 millimeters of mercury.

*Example 13*

10 parts of a catalyst prepared by mixing 30 parts of kieselguhr with a solution of 300 parts of nickel nitrate in 700 parts of water, precipitating with aqueous sodium bicarbonate, filtering, washing, adding a solution of 3 parts of chromic acid, drying, pulverizing and treating with hydrogen at about 270° C. are introduced into 90 parts of fused stearic acid directly after the reduction of the catalyst. The mixture of stearic acid and the catalyst is heated in a stirring autoclave at 240° C. while introducing hydrogen until a pressure of 170 atmospheres is attained, heating being continued until a sample shows the saponification value of about 100 of octodecyl stearic ester. The product is then separated from the catalyst by filtration in a heated filter press. The filtrate solidifies to a colorless waxy mass having a melting point between 50° and 60° C. Traces of octodecyl alcohol and/or of stearic acid can be easily separated by distillation. By stopping the reaction before a sample shows the aforesaid saponification value, such as 140, a mixture of the waxy ester and stearic acid together with a small quantity of alcohol can be obtained; on the other hand, by proceeding until the saponification value is below 100 mixtures of the aforesaid waxy stearic ester and octodecyl alcohol together with a small quantity of acid can be obtained. In this manner the ratio between the different products can be largely varied. In a similar manner mixtures of waxy esters and/or of alcohols can be prepared from mixtures of fatty acids with different numbers of carbon atoms. In this manner it is possible to prepare waxy products having different properties, for example as regards hardness, gloss and possibility of emulsification according to the desired purpose of application of the said products.

*Example 14*

Olive oil is mixed with 1.5 per cent of a cobalt catalyst prepared by making into a paste 100 parts of cobalt carbonate and 0.8 part of potassium nitrite, drying, pulverizing and treating with hydrogen at 325° C., and the mixture is heated to 240° C. while introducing hydrogen at a pressure of 300 atmospheres until the saponification value has decreased to about 60. A product having a melting point of about 55° C. and the shade of a pale bees-wax is obtained; it is softer than a product prepared from the same initial material but in the production of which the reaction is stopped at a higher saponification value of say 130 and which may be employed for polishing purposes for example for wood or linoleum. Similar waxy products can be obtained from palm oil.

*Example 15*

Coconut oil having a saponification value of 245 is mixed with 1.5 per cent its weight of metallic cobalt prepared by treating basic cobalt carbonate containing about 0.5 per cent by weight of sodium carbonate with hydrogen at about 350° C. and the mixture is heated to 200° C. while forcing in hydrogen at a pressure of 250 atmospheres until the saponification value has decreased to about 100. The semi-solid product consists of esters of the alcohols, formed by the reduction of the acids, and the acids of the oil together with the alcohols in the free state, the reduction products of glycerine and traces of initial oil. If the product be drawn off from the reaction vessel in the hot state the reduction products of glycerine are evaporated together with water and alcohols of low molecular weight formed from the lower acids of the oil. Products having a saponification value of from 70 to 100 or less possess, when employed in small quantities the agreeable odour of lower alcohols, such as octyl or dodecyl alcohols and may be usefully employed as perfumes or fixatives for other perfumes in the soap industries. They may be also employed for softening hard fibres.

What I claim is:

1. A process of producing alcohols which comprises treating with hydrogen an anhydride of an aliphatic carboxylic acid, said acid containing more than one carbon atom per carboxyl group, at a temperature in excess of 200° C., and under a pressure of at least 30 atmospheres in the presence of a hydrogenating catalyst.

2. A process of producing alcohols which comprises treating with hydrogen an anhydride of an aliphatic carboxylic acid, said acid containing more than one carbon atom per carboxyl group, at a temperature in excess of 200° C., and under a pressure of at least 30 atmospheres in the presence of a hydrogenating catalyst containing copper.

3. A process of producing alcohols which comprises treating with hydrogen an anhydride of an aliphatic carboxylic acid, said acid containing more than one carbon atom per carboxyl group, at a temperature in excess of 200° C., and under a pressure of at least 30 atmospheres in the liquid phase in the presence of a hydrogenating catalyst.

4. The process as defined in claim 1 wherein the catalyst is a metal hydrogenating catalyst.

5. The process as defined in claim 1 wherein said carboxylic acid is a high molecular weight fatty acid.

6. The process as defined in claim 1 wherein a mixture of the anhydrides of palmitic and stearic acids are treated with hydrogen.

7. The process as defined in claim 1 wherein the anhydride is lauric acid anhydride.

8. The process as defined in claim 1 wherein the catalyst is a metal hydrogenating catalyst and the carboxylic acid is a high molecular weight fatty acid.

9. The process as defined in claim 1 wherein a mixture of the anhydrides of palmitic and stearic acids are treated with hydrogen and wherein the catalyst is cobalt.

10. The process as defined in claim 1 wherein the acid is lauric acid and wherein the catalyst is cobalt.

11. The process as defined in claim 1 wherein the catalyst is a metal hydrogenating catalyst activated by a substance selected from the class consisting of hydroxides, oxides, carbonates, phosphates, silicates and nitrates of the alkali metals, alkaline earth metals and rare earth metals.

12. The process as defined in claim 1 wherein a mixture of the anhydrides of palmitic and stearic acids are treated with hydrogen and wherein the catalyst is cobalt activated with potassium oxide.

OTTO SCHMIDT.